US012581465B2

(12) United States Patent
Iwabuchi et al.

(10) Patent No.: US 12,581,465 B2
(45) Date of Patent: Mar. 17, 2026

(54) RADIO COMMUNICATION METHOD, RADIO COMMUNICATION SYSTEM, RADIO BASE STATION, AND REPEATER

(71) Applicant: NTT, Inc., Tokyo (JP)

(72) Inventors: Masashi Iwabuchi, Musashino (JP);
Tomoaki Ogawa, Musashino (JP);
Tomoki Murakami, Musashino (JP)

(73) Assignee: NTT, Inc., Tokyo (JP)

( * ) Notice: Subject to any disclaimer, the term of this patent is extended or adjusted under 35 U.S.C. 154(b) by 678 days.

(21) Appl. No.: 17/924,404

(22) PCT Filed: May 25, 2020

(86) PCT No.: PCT/JP2020/020619
§ 371 (c)(1),
(2) Date: Nov. 10, 2022

(87) PCT Pub. No.: WO2021/240619
PCT Pub. Date: Dec. 2, 2021

(65) Prior Publication Data
US 2023/0209510 A1     Jun. 29, 2023

(51) Int. Cl.
*H04W 72/20*     (2023.01)
*H04L 5/14*     (2006.01)
*H04W 72/0446*     (2023.01)
(52) U.S. Cl.
CPC ........... *H04W 72/0446* (2013.01); *H04L 5/14* (2013.01); *H04W 72/20* (2023.01)
(58) Field of Classification Search
CPC ...... H04W 72/0446; H04W 72/20; H04L 5/14
(Continued)

(56) References Cited

U.S. PATENT DOCUMENTS

| 10,334,580 B2 * | 6/2019 | Yang ................... H04L 27/2602 |
| 2013/0315083 A1 * | 11/2013 | Jung ........................ H04B 7/26 |
| | | 370/252 |
| 2015/0319724 A1 * | 11/2015 | Chae ..................... H04W 8/005 |
| | | 370/315 |

FOREIGN PATENT DOCUMENTS

JP     2016-504860 A     2/2016

OTHER PUBLICATIONS

Yuichiro Sugihara et al., "Study on Cellular Networks using Millimeter-Wave Massive Relay MIMO", IEICE Society Conference 2019, B-5-54, Sep. 2019.

(Continued)

*Primary Examiner* — Christopher R Crompton
(74) *Attorney, Agent, or Firm* — Harness, Dickey & Pierce, P.L.C.

(57)     ABSTRACT

A radio base station and a radio terminal perform radio communication based on a TDD scheme. A slot configuration includes allocation of a downlink period and an uplink period to the radio terminal. The relay reflects a signal transmitted from the radio base station or the radio terminal or receives and reradiates the signal to form a transmission path between the radio base station and the radio terminal. A relay characteristic includes a parameter determining a coverage area in which the transmission path is formed. A downlink relay characteristic during the downlink period and an uplink relay characteristic during the uplink period are not common but determined separately. Then, the relay characteristic during the downlink period is set to the downlink relay characteristic, and the relay characteristic during the uplink period is set to the uplink relay characteristic. In other words, the relay characteristic is switched between downlink communication and uplink communication.

7 Claims, 10 Drawing Sheets

(58) Field of Classification Search
USPC .......................................................... 370/329
See application file for complete search history.

(56) References Cited

OTHER PUBLICATIONS

C. Liaskos et al., "Using any Surface to Realize a New Paradigm for Wireless Communications", Communications of the ACM, vol. 61, No. 11, Jun. 2018.

* cited by examiner

100: RADIO BASE STATION

CON

CON

200: RELAY

200

300: RADIO TERMINAL

10: RADIO COMMUNICATION SYSTEM

RADIO COMMUNICATION METHOD, RADIO COMMUNICATION SYSTEM, RADIO BASE STATION, AND REPEATER

CROSS-REFERENCE TO RELATED APPLICATIONS

This application is a 371 U.S. National Phase of International Application No. PCT/JP2020/020619, filed on May 25, 2020. The entire disclosure of the above application is incorporated herein by reference.

TECHNICAL FIELD

The present disclosure relates to a technique for performing communication between a radio base station and a radio terminal via a relay.

BACKGROUND ART

To achieve high speed and large capacity of a radio access, utilization of a high frequency band enabling a wide bandwidth to be available has attracted attention. For example, the 5th generation mobile communication system uses a 28 GHz band to achieve high-speed and large-capacity communication. As another example, IEEE 802.11ad (millimeter wave radio LAN system), which is a wireless LAN standard, uses a 60 GHz band to achieve high-speed and large-capacity communication.

Radio waves in a high frequency band have a characteristic of being easily attenuated and difficult to be diffracted compared with radio waves in a low frequency band. Thus, problems in the high frequency band include decrease in transmission distance due to radio wave attenuation and deterioration in reception quality due to an obstacle or the like.

Beamforming using a multi-element antenna is effective for compensating for radio wave attenuation. A beamforming gain allows for compensating for radio wave attenuation and increasing the transmission distance. In the case of beamforming, a reception station mainly receives radio waves intensively transmitted from a transmission station in a specific direction. That is, the reception station mainly receives radio waves in one transmission path with high power. This limits the number of spatial multiplexing to only one (or two by polarization multiplexing), and it is difficult to obtain a spatial diversity effect.

To suppress deterioration of reception quality due to obstacles or the like, it is conceivable to provide multiple transmission points. For example, installing multiple transmission antennas at different locations enables an area having a non-line of sight environment to be reduced and reception quality to be improved. This makes it possible to solve the problems in the beamforming described above. However, installing the multiple transmission antennas at different locations leads to an increase in network cost and installation location. From the viewpoint of providing multiple transmission points, using a relay (reflector, repeater, and the like) with lower cost and smaller installation scale is also effective. In particular, in recent years, a metasurface reflector capable of dynamically controlling a reflection characteristic such as a reflection direction, a passive repeater capable of dynamically controlling a phase and an amplitude, and the like have been developed (see NPL 1 and NPL 2). By utilizing such the relay to form a plurality of transmission paths for one reception station, it is possible to improve communication performance such as communication quality and spatial multiplicity.

CITATION LIST

Non Patent Literature

NPL 1: Yuichiro Sugihara, Kei Sakaguchi, "Study on Cellular Networks using Millimeter-Wave Massive Relay MIMO", IEICE Society Conference 2019, B-5-54, September 2019
NPL 2: C. Liaskos, A. Tsioliaridou, A. Pitsillides, S. Ioannidis, and I. Akyildiz, "Using any Surface to Realize a New Paradigm for Wireless Communications", Communications of the ACM, Vol. 61, No. 11, June 2018

SUMMARY OF THE INVENTION

Technical Problem

Performing communication between a radio base station and a radio terminal via a relay is considered. The relay reflects a signal transmitted from the radio base station to the radio terminal, or receives and reradiates the signal. As a result, a transmission path is formed between the radio base station and the radio terminal via the relay. A relay characteristic includes a reflection direction, a reradiation direction, or the like of the signal in the relay.

The inventor of the present application has recognized the following problems regarding setting of the relay characteristic for the first time.

It is assumed that the radio base station recognizes (estimates) a position of the radio terminal being a transmission destination during downlink communication from the radio base station to the radio terminal. In this case, it is possible to improve communication quality by setting the relay characteristic such that the transmission paths are concentrated on the radio terminal in consideration of the position of the radio terminal being the transmission destination. However, such the relay characteristic preferable for the downlink communication is not necessarily appropriate for uplink communication.

As an example, a case where multiple radio terminals perform random accesses to the radio base station at the respective timings is considered. It is not possible for the radio base station to predict a timing at which the radio terminal performs the uplink random access and the position of the radio terminal at that timing. A signal may be transmitted from such the radio terminal to the radio base station. In this case, the transmission path for the radio terminal that performs the uplink random access is not always established via the relay with the same relay characteristic as in the case of the downlink communication. That is, the communication performance using the relay is not sufficiently exhibited.

As another example, a case of a radio access method (grant method) in which the radio base station allocates a transmission timing of an uplink signal to the radio terminal in advance is considered. In a situation where the radio terminal moves, the position of the radio terminal at the allocated transmission timing changes from the position at the time of the downlink communication. Thus, the transmission path may not be formed via the relay with the same relay characteristic as in the case of the downlink communication. That is, the communication performance using the relay is not sufficiently exhibited.

As described above, there is a difference in the number and distribution of radio terminals between the downlink communication and the uplink communication. Thus, when the same relay characteristic is used both in the downlink communication and the uplink communication, the communication performance using the relay is not sufficiently obtained. In the related art, the relay characteristic has not been set in consideration of such the difference between the downlink communication and the uplink communication. In that sense, there is room for improvement in the setting of the relay characteristic.

An object of the present disclosure is to provide a technique capable of further improving communication performance when communication is performed between a radio base station and a radio terminal via a relay.

Means for Solving the Problem

A first aspect is directed to a radio communication method of performing communication between a radio base station and a radio terminal via a relay.

The relay is configured to reflect a signal transmitted from the radio base station or the radio terminal or receive and reradiate the signal to form a transmission path between the radio base station and the radio terminal.

A relay characteristic, which is a characteristic of the relay, includes a parameter determining a coverage area in which the transmission path is formed.

The radio communication method is based on a time division duplex (TDD) scheme.

The radio communication method includes:

(A) determining a slot configuration including allocation of a downlink period and an uplink period to the radio terminal;

(B) separately determining a downlink relay characteristic being the relay characteristic during the downlink period and an uplink relay characteristic being the relay characteristic during the uplink period;

(C) performing downlink communication and uplink communication between the radio base station and the radio terminal during the downlink period and the uplink period, respectively; and (D) setting the relay characteristic during the downlink period to the downlink relay characteristic and setting the relay characteristic during the uplink period to the uplink relay characteristic.

A second aspect is directed to a radio communication system.

The radio communication system includes:

a radio base station configured to communicate with a radio terminal based on a TDD scheme; and a relay configured to reflect a signal transmitted from the radio base station or the radio terminal or receive and reradiate the signal to form a transmission path between the radio base station and the radio terminal.

A relay characteristic, which is a characteristic of the relay, includes a parameter determining a coverage area in which the transmission path is formed.

The radio base station determines a slot configuration including allocation of a downlink period and an uplink period to the radio terminal.

The radio base station separately determines a downlink relay characteristic being the relay characteristic during the downlink period and an uplink relay characteristic being the relay characteristic during the uplink period.

The radio base station transmits slot configuration information indicating the slot configuration to the radio terminal.

The radio base station transmits characteristic control information indicating the downlink relay characteristic and the uplink relay characteristic and the slot configuration information to the relay.

The radio base station and the radio terminal perform downlink communication and uplink communication during the downlink period and the uplink period, respectively, based on the slot configuration information.

The relay is configured to set the relay characteristic during the downlink period to the downlink relay characteristic and set the relay characteristic during the uplink period to the uplink relay characteristic, based on the slot configuration information and the characteristic control information.

A third aspect is directed to a radio base station that communicates with a radio terminal based on a TDD scheme.

A relay is configured to reflect a signal transmitted from the radio base station or the radio terminal or receive and reradiate the signal to form a transmission path between the radio base station and the radio terminal.

A relay characteristic, which is a characteristic of the relay, includes a parameter determining a coverage area in which the transmission path is formed.

The radio base station determines a slot configuration including allocation of a downlink period and an uplink period to the radio terminal.

The radio base station separately determines a downlink relay characteristic being the relay characteristic during the downlink period and an uplink relay characteristic being the relay characteristic during the uplink period.

The radio base station transmits slot configuration information indicating the slot configuration to the radio terminal.

The radio base station transmits characteristic control information indicating the downlink relay characteristic and the uplink relay characteristic and the slot configuration information to the relay.

The radio base station and the radio terminal perform downlink communication and uplink communication during the downlink period and the uplink period, respectively, based on the slot configuration information.

The relay is configured to set the relay characteristic during the downlink period to the downlink relay characteristic and set the relay characteristic during the uplink period to the uplink relay characteristic, based on the slot configuration information and the characteristic control information.

A fourth aspect is directed to a relay that relays communication between a radio base station and a radio terminal.

The radio base station and the radio terminal perform the communication based on a TDD scheme.

The relay is configured to reflect a signal transmitted from the radio base station or the radio terminal or receive and reradiate the signal to form a transmission path between the radio base station and the radio terminal.

A relay characteristic, which is a characteristic of the relay, includes a parameter determining a coverage area in which the transmission path is formed.

The radio base station determines a slot configuration including allocation of a downlink period and an uplink period to the radio terminal.

The radio base station separately determines a downlink relay characteristic being the relay characteristic during the downlink period and an uplink relay characteristic being the relay characteristic during the uplink period.

The radio base station transmits slot configuration information indicating the slot configuration to the radio terminal.

The radio base station transmits characteristic control information indicating the downlink relay characteristic and the uplink relay characteristic and the slot configuration information to the relay.

The radio base station and the radio terminal perform downlink communication and uplink communication during the downlink period and the uplink period, respectively, based on the slot configuration information.

The relay is configured to set the relay characteristic during the downlink period to the downlink relay characteristic and set the relay characteristic during the uplink period to the uplink relay characteristic, based on the slot configuration information and the characteristic control information.

Effects of the Invention

According to the present disclosure, the radio base station and the radio terminal perform the radio communication based on the TDD scheme. The slot configuration includes the allocation of the downlink period and the uplink period to the radio terminal. The downlink relay characteristic during the downlink period and the uplink relay characteristic during the uplink period are not common but determined separately. Then, the relay characteristic during the downlink period is set to the downlink relay characteristic, and the relay characteristic during the uplink period is set to the uplink relay characteristic. In other words, the relay characteristic is switched between the downlink communication and the uplink communication. Flexibly switching the relay characteristic makes it possible to form appropriate transmission paths for the downlink communication and the uplink communication, respectively. As a result, the communication performance using the relay is further improved.

6

Figure 9:
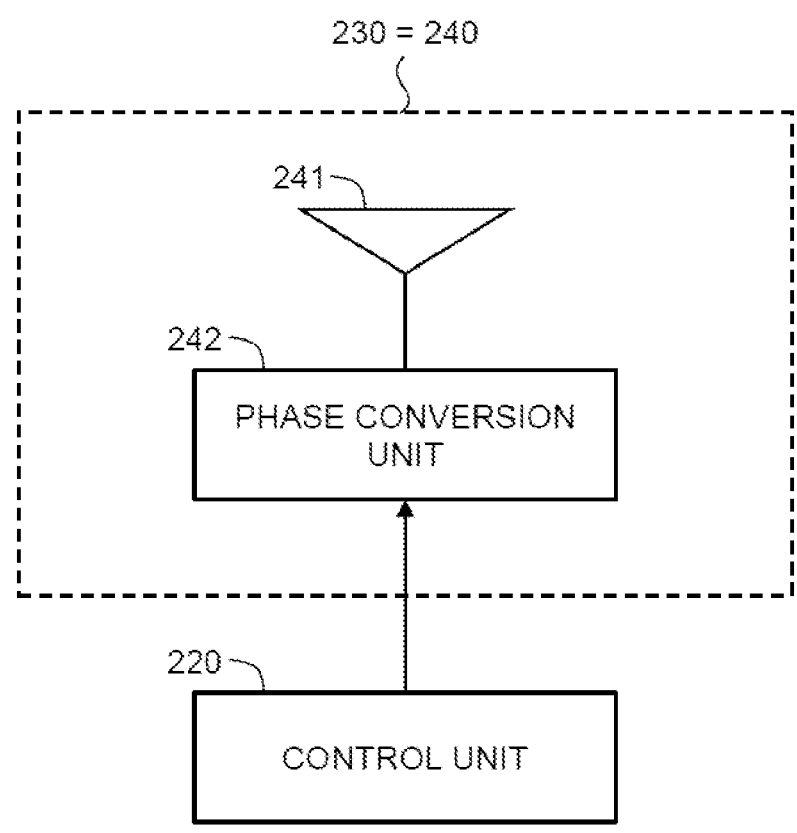

FIG. 9 is a block diagram showing an example of a relay processing unit of the relay according to an embodiment of the present disclosure.

Figure 10:
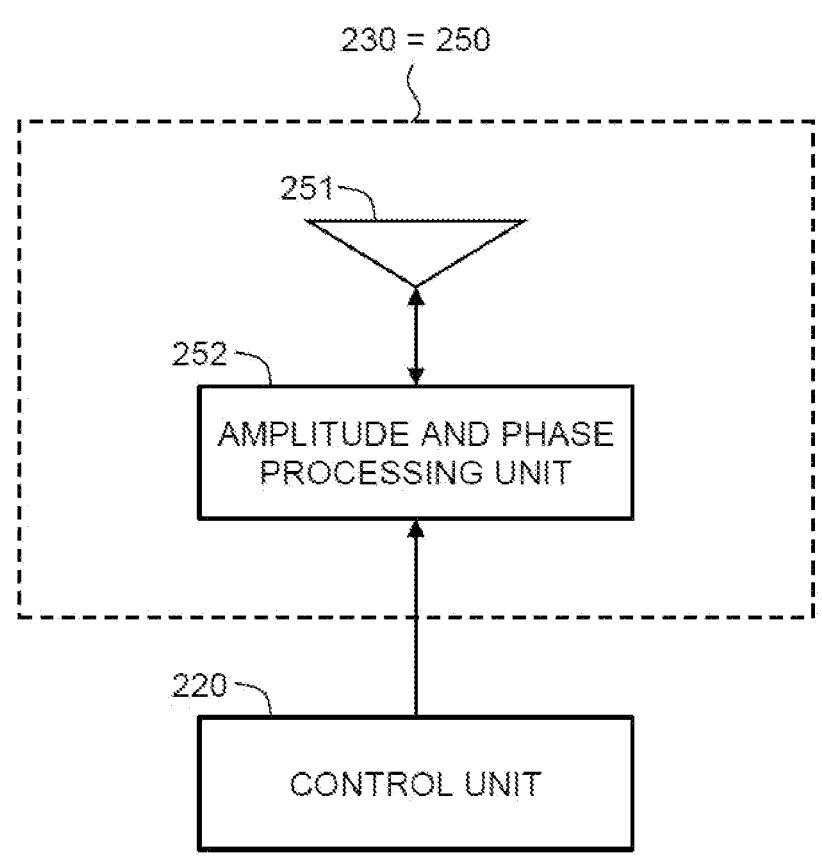

FIG. 10 is a block diagram showing another example of the relay processing unit of the relay according to an embodiment of the present disclosure.

DESCRIPTION OF EMBODIMENTS

Hereinafter, embodiments of the present disclosure will be described with reference to the attached drawings.

1. Basic Configuration of Radio Communication System

Figure 1:
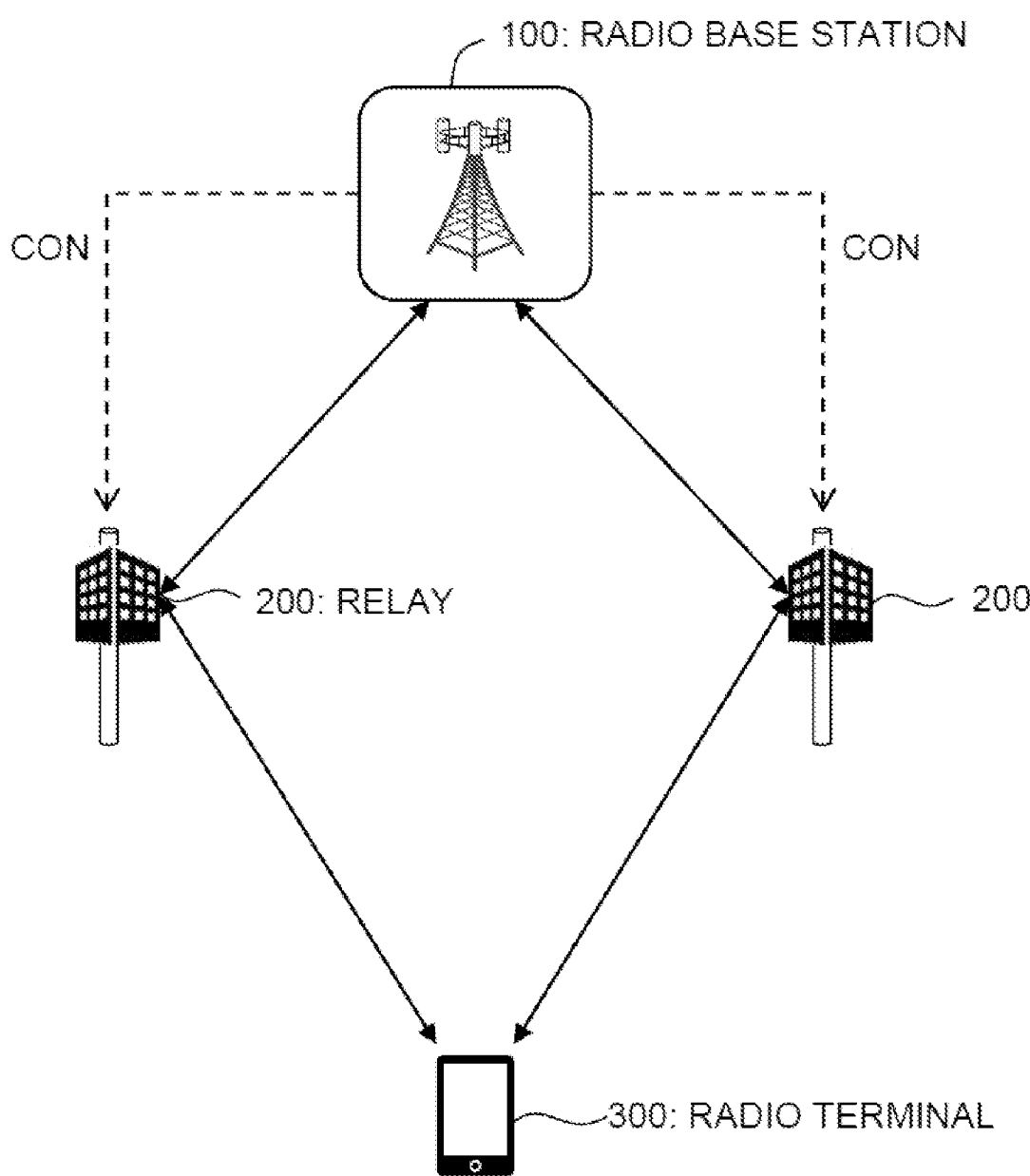
FIG. 1 is a schematic diagram showing an example of a basic configuration of a radio communication system according to an embodiment of the present disclosure.

FIG. 1 is a schematic diagram showing an example of a basic configuration of a radio communication system 10 according to an embodiment of the present disclosure. The radio communication system 10 includes a radio base station 100, a relay 200, and a radio terminal 300. Radio communication is performed between the radio base station 100 and the radio terminal 300. For example, the radio communication is performed in a high frequency band such as a millimeter wave band. In order to compensate for radio wave attenuation in the high frequency band, beamforming using a multi-element antenna is effective.

The relay 200 is configured to reflect an incident signal or to receive and reradiate the incident signal. Examples of the relay 200 include a reflector and a repeater. In the present embodiment, a "relay characteristic" which is a characteristic of the relay 200 can be dynamically controlled. The relay characteristic includes at least a reflection direction or a reradiation direction of the signal in the relay 200. The relay characteristic may include a beam width or a beam shape. For example, the relay 200 includes a metasurface reflector capable of dynamically controlling reflection characteristics such as a reflection direction, a reflectance, a transmittance, and a reflected beam shape. As another example, the relay 200 includes a passive repeater capable of dynamically controlling a phase and an amplitude of a received signal.

The relay characteristic of the relay 200 can be controlled by the radio base station 100. Specifically, the radio base station 100 transmits characteristic control information CON for controlling he relay characteristic to the relay 200. The characteristic control information CON specifies a desired relay characteristic (for example, at least one reflection direction and at least one reradiation direction). The relay 200 sets its own relay characteristic in accordance with the characteristic control information CON.

According to the present embodiment, the radio communication between the radio base station 100 and the radio terminal 300 is performed by using the relay 200. Specifically, the radio base station 100 or the radio terminal 300 forms a transmission beam and transmits a signal by the transmission beam. The relay 200 reflects the signal transmitted from the radio base station 100 or the radio terminal 300 or receives and reradiates the signal. The radio terminal 300 or the radio base station 100 receives the signal that has been reflected or reradiated by the relay 200. In this manner, using the relay 200 makes it possible to form a transmission path between the radio base station 100 and the radio terminal 300 via the relay 200. It should be noted that the transmission path here means a transmission path where the reception side is able to receive the signal transmitted by the transmission side with predetermined reception power or higher.

The number of relays 200 is equal to or more than 1. When a plurality of relays 200 are installed, a plurality of transmission paths may be formed via the plurality of relays 200, respectively. Not only the transmission path via the relay 200 but also a direct transmission path not passing through any relay 200 may be present. In either case, a plurality of transmission paths can be formed with respect to a single radio terminal 300 by utilizing the relay 200. Forming the plurality of transmission paths makes it possible to improve a communication performance such as a communication quality and spatial multiplicity.

With a movement of the radio terminal 300, an optimal transmission path via the relay 200 may also change. Therefore, the radio base station 100 may dynamically change the relay characteristic of the relay 200 according to the movement of the radio terminal 300.

2. Switching of Relay Characteristic

2-1. Comparison of Downlink Communication and Uplink Communication

Figure 2:
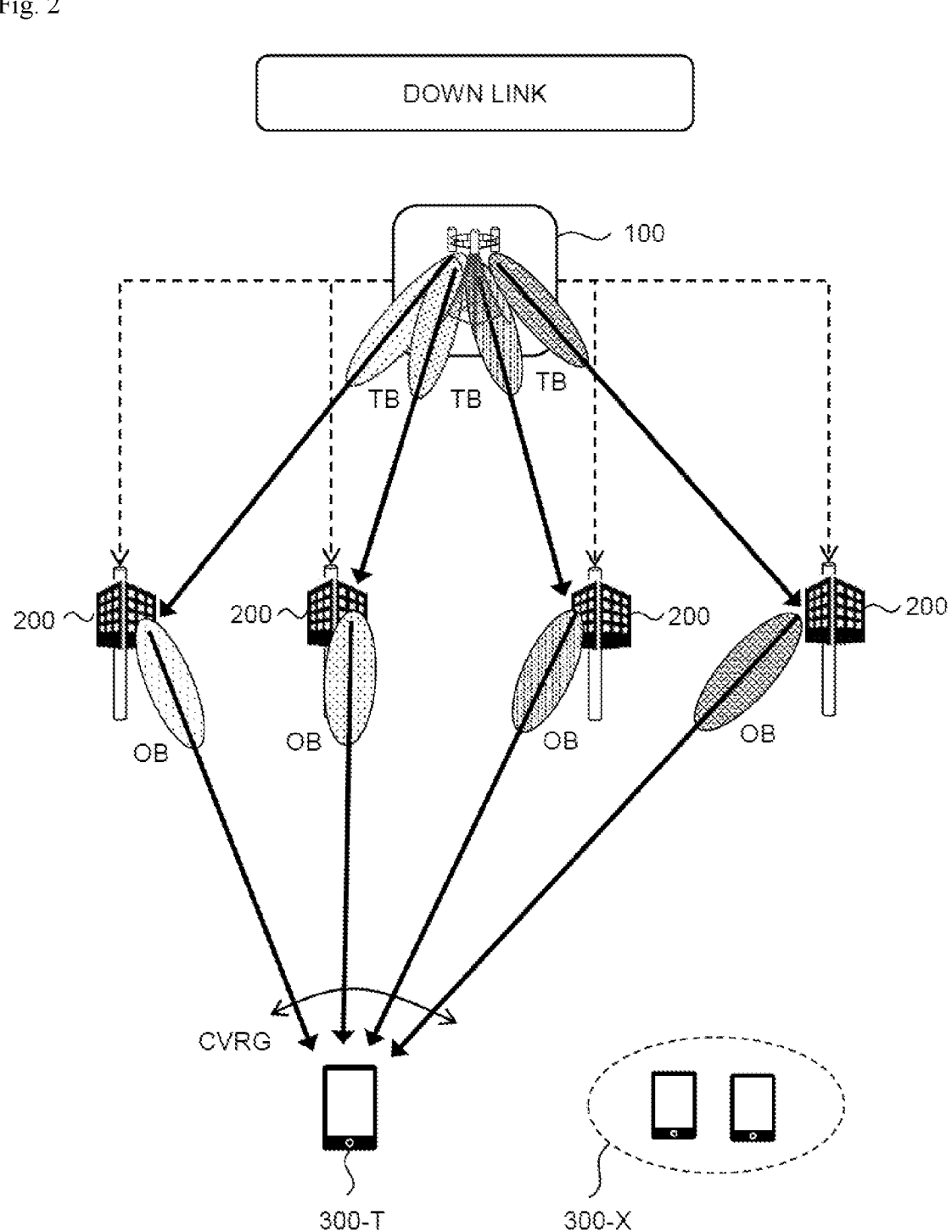
FIG. 2 is a conceptual diagram for explaining an example of downlink communication in the radio communication system according to an embodiment of the present disclosure.

FIG. 2 is a conceptual diagram for explaining an example of downlink communication from the radio base station 100 to the radio terminal 300. The radio terminal 300 being a communication partner is hereinafter referred to as a "radio terminal 300-T." The radio base station 100 recognizes the radio terminal 300-T being the communication partner. On the other hand, a radio terminal 300-X is the radio terminal 300 that is not recognized by the radio base station 100.

The radio base station 100 forms a transmission beam TB and transmits a downlink data signal by the transmission beam TB. In the example shown in FIG. 2, a plurality of relays 200 are installed, and the radio base station 100 transmits downlink data signals in the respective directions of the plurality of relays 200. Each relay 200 reflects the downlink data signal transmitted from the radio base station 100 or receives and reradiates the downlink data signal. The radio terminal 300-T receives the downlink data signal reflected or reradiated by the relay 200.

In order to improve the communication quality of the downlink communication, it is preferable to concentrate the transmission paths via the relays 200 on the radio terminal 300-T, as shown in FIG. 2. That is, it is preferable to direct an emission beam OB (i.e., the reflected beam, the reradiated beam) from each relay 200 toward the radio terminal 300-T.

In view of the above, the radio base station 100 controls the relay characteristic of each relay 200 such that the transmission paths via the relays 200 are concentrated on the radio terminal 300-T. For example, the radio base station 100 recognizes or estimates a position of the radio terminal 300-T at a timing of start of the communication. Then, based on the position of the radio terminal 300-T, the radio base station 100 determines the relay characteristic of each relay 200 so that the emission beam OB is directed toward the radio terminal 300-T. Before transmitting the downlink data signal, the radio base station 100 transmits the characteristic control information CON indicating the determined relay characteristic to each relay 200. Each relay 200 sets its own relay characteristic in accordance with the characteristic control information CON. After that, the radio base station 100 transmits the downlink data signal.

A "coverage area CVRG" is a communication range in which the transmission path between the radio base station 100 and the radio terminal 300 is formed. It can be said that the relay characteristic of the relay 200 includes a parameter (e.g., the reflection direction, the reradiation direction, the beam width, the beam shape, and the like) that determines the coverage area CVRG. Changing the relay characteristic makes it possible to change the coverage area CVRG.

In the example shown in FIG. 2, the coverage area CVRG is limited to a periphery of the position of the radio terminal 300-T. Limiting the coverage area CVRG makes it possible to improve the communication performance (e.g., the communication quality, the spatial multiplicity, and the like) of the downlink communication with respect to the radio terminal 300-T. That is, the effect of improving the communication performance by using the relay 200 can be sufficiently obtained. On the other hand, there is no need to transmit the downlink data signal to the radio terminal 300-X. Thus, there is no problem even though the radio terminal 300-X is out of the coverage area CVRG.

However, the relay characteristic (that is, the coverage area CVRG) preferable for the downlink communication is not necessarily appropriate for uplink communication.

Figure 3:
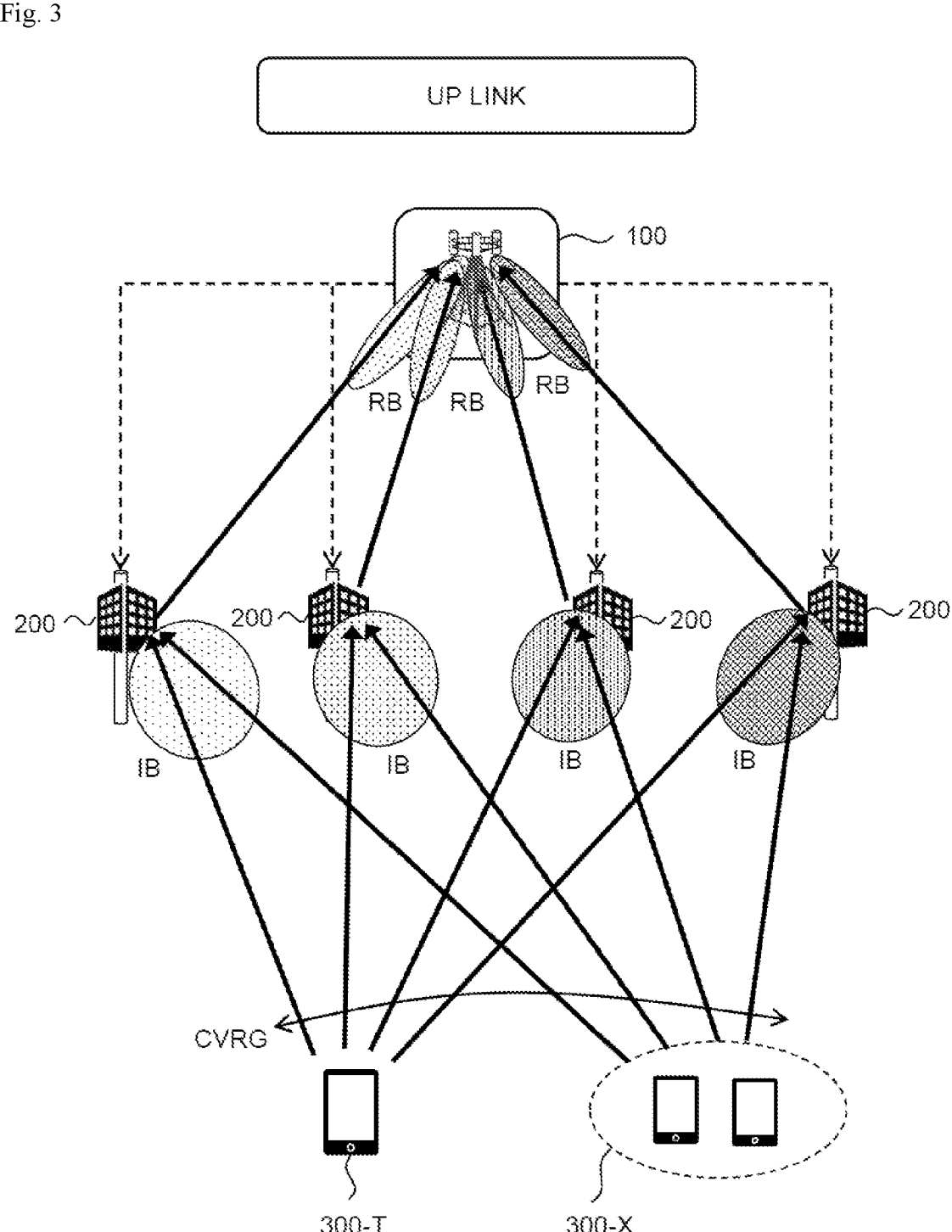
FIG. 3 is a conceptual diagram for explaining an example of uplink communication in the radio communication system according to an embodiment of the present disclosure.

FIG. 3 is a conceptual diagram for explaining an example of the uplink communication from the radio terminal 300 to the radio base station 100. The radio terminal 300-T forms a transmission beam and transmits an uplink data signal by the transmission beam. Each relay 200 reflects the uplink data signal transmitted from the radio terminal 300-T or receives and reradiates the uplink data signal. An incident beam IB represents a beam incident to the relay 200 and to be reflected or reradiated in a direction to the radio base station 100. The radio base station 100 receives the uplink data signal reflected or reradiated by the relay 200, by a reception beam RB.

Here, as an example, a case where multiple radio terminals 300-X perform random accesses to the radio base station 100 at the respective timings is considered. It is not possible for the radio base station 100 to predict a timing at which the radio terminal 300-X performs the uplink random access and the position of the radio terminal 300-X at that timing. A signal may be transmitted from such the radio terminal 300-X to the radio base station 100. In that case, the transmission path for the radio terminal 300-X that performs the uplink random access is not established via the relay 200 with the same relay characteristic (i.e., the coverage area CVRG) as in the case of the downlink communication shown in FIG. 2. That is, the communication performance using the relay 200 is not sufficiently exhibited. In order to surely establish the transmission path to the radio terminal 300-X via the relay 200, it is preferable to expand the coverage area CVRG as compared with the case of the downlink communication, as shown in FIG. 3.

As another example, a case of a radio access method (grant method) in which the radio base station 100 allocates a transmission timing of the uplink signal to the radio terminal 300-T in advance is considered. In a situation where the radio terminal 300-T moves, the position of the radio terminal 300-T at the allocated transmission timing changes from the position at the time of the downlink communication. Therefore, in the case of the same relay characteristic (i.e., the coverage area CVRG) as in the case of the downlink communication shown in FIG. 2, the radio terminal 300-T may be out of the coverage area CVRG at the time of the uplink communication. In other words, the transmission path may not be formed between the radio terminal 300-T and the radio base station 100 via the relay 200. In this case, the communication performance using the relay 200 is not sufficiently exhibited. In order to maintain the transmission path via the relay 200, it is preferable to expand the coverage area CVRG at the time of the uplink communication as compared with the case of the downlink communication.

As described above, there is a difference in the number and distribution of radio terminals 300 between the downlink communication and the uplink communication. Thus, if the same relay characteristic is used both in the downlink communication and the uplink communication without considering such the difference, the communication performance using the relay 200 is not sufficiently obtained.

In view of the above, according to the present embodiment, the relay characteristic is flexibly switched between the downlink communication and the uplink communication in order to further improve the communication performance using the relay 200. In order to switch the relay characteristic between the downlink communication and the uplink communication, a time division duplex (TDD) scheme is adopted. That is, the radio base station 100 and the radio terminal 300-T perform bidirectional radio communication based on the TDD scheme.

2-2. Slot Configuration

In the TDD scheme, the radio base station 100 determines (schedules) allocation of a "downlink period PDL" and an "uplink period PUL" to the radio terminal 300-T being the communication partner. The downlink period PDL is a period allocated to the downlink communication. The uplink period PUL is a period allocated to the uplink communication. A slot configuration includes the allocation of the downlink period PDL and the uplink period PUL to the radio terminal 300-T.

Figure 4:
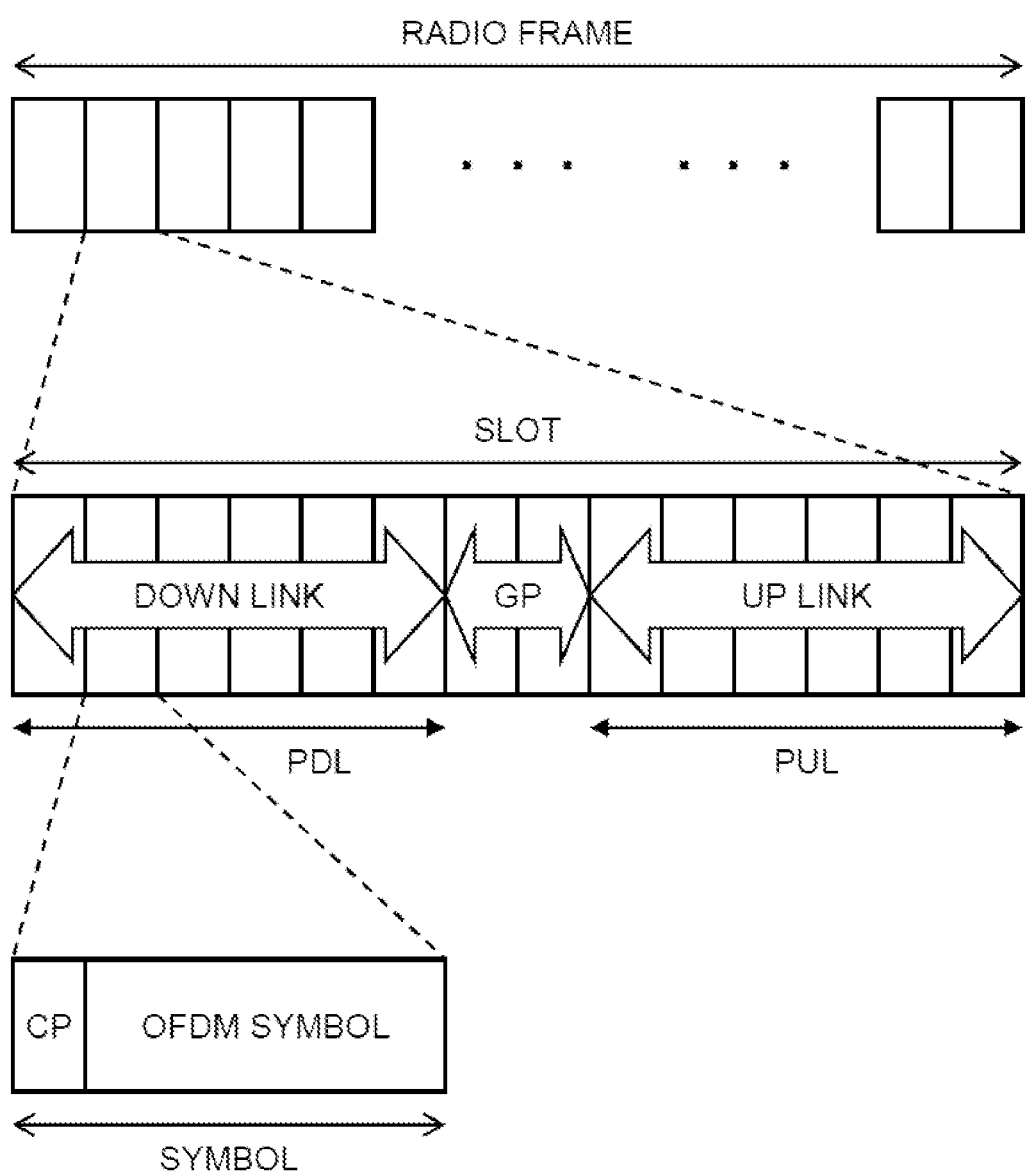
FIG. 4 is a conceptual diagram for explaining an example of a slot configuration in an embodiment of the present disclosure.

FIG. 4 is a conceptual diagram for explaining an example of the slot configuration. A radio frame includes a plurality of slots. Each slot includes a plurality of symbols. For example, in a cellular system, 14 consecutive orthogonal frequency division multiplexing (OFDM) symbols form one slot, as defined by 3rd generation partnership project (3GPP); Technical Specification 38.213 (Release 15). A cyclic prefix (CP) is inserted at the head of each OFDM symbol. The symbol length and the slot length change according to subcarrier spacing.

In the example shown in FIG. 4, a single slot includes the downlink period PDL and the uplink period PUL. That is, in a single slot, one or more OFDM symbols are allocated to the downlink period PDL, and one or more OFDM symbols are allocated to the uplink period PUL. In order to prevent collision between a downlink data signal and an uplink data signal, a guard period (guard time) GP is provided between the downlink period PDL and the uplink period PUL. A single slot may include a plurality of downlink periods PDL and a plurality of uplink periods PUL.

Respective traffic amounts of the downlink communication and the uplink communication vary with time. In order to cope with a variation in a traffic ratio between the downlink communication and the uplink communication, the allocation of the downlink period PDL and the uplink period PUL may be dynamically changed. For example, a plurality of slot configuration patterns having different ratios between the downlink period PDL and the uplink period PUL are prepared, and an appropriate slot configuration pattern is selected according to the traffic ratio. This makes it possible to improve the communication efficiency. Moreover, it is also possible to realize a more flexible traffic ratio by coupling a plurality of slots.

As still another example, the downlink period PDL, the uplink period PUL, and the guard period GP may be allocated in units of slots.

2-3. Processing Related to Switching of Relay Characteristic

Figure 5:
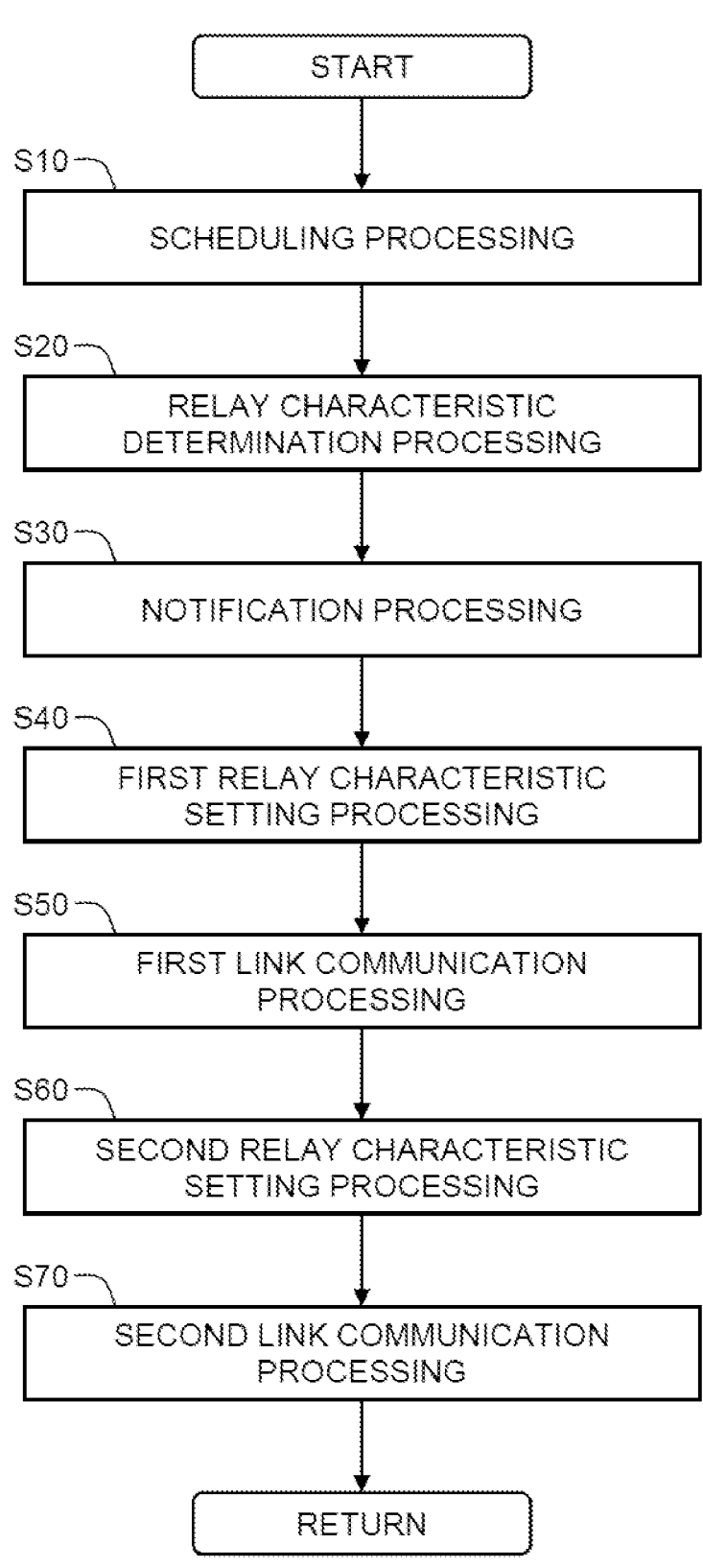
FIG. 5 is a flowchart showing processing related to switching of a relay characteristic according to an embodiment of the present disclosure.
Figure 6:
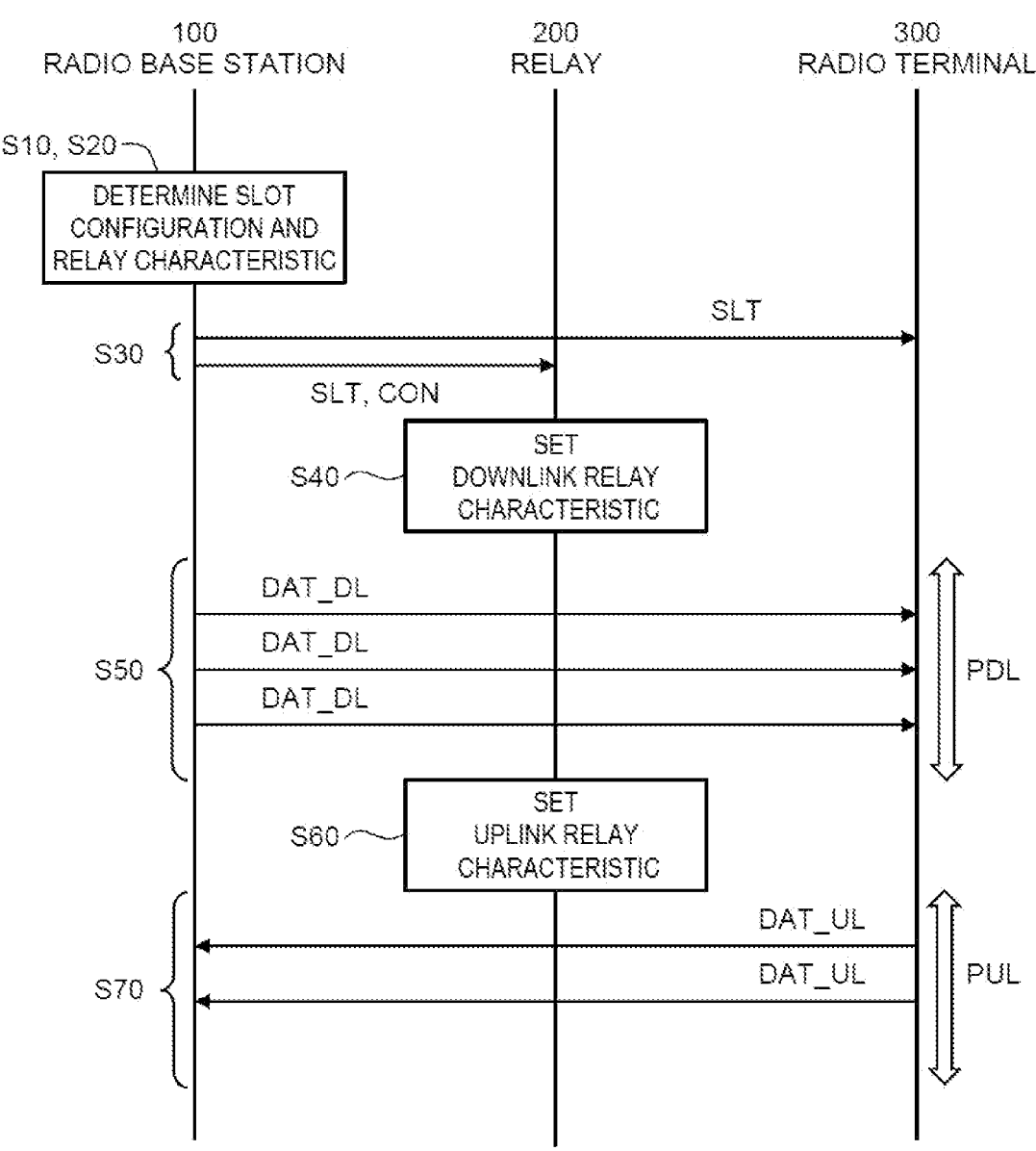
FIG. 6 is a sequence diagram showing an example of processing related to switching of a relay characteristic according to an embodiment of the present disclosure.

FIG. 5 is a flowchart showing processing related to switching of the relay characteristic according to the present embodiment. FIG. 6 is a sequence diagram showing processing in the case of the slot configuration shown in FIG. 4. The processing related to the switching of the relay characteristic will be described with reference to FIGS. 5 and 6.

Step S10: Scheduling Processing

In Step S10, the radio base station 100 performs scheduling processing. Specifically, the radio base station 100 determines (schedules) the slot configuration for the radio terminal 300-T which is the communication partner. The slot configuration includes the allocation of the downlink period PDL and the uplink period PUL to the radio terminal 300-T (see FIG. 4). Slot configuration information SLT indicates the slot configuration determined.

Step S20: Relay Characteristic Determination Processing

In Step S20, the radio base station 100 performs relay characteristic determination processing that determines the relay characteristic of each relay 200. The relay characteristics in the downlink period PDL and the uplink period PUL are referred to as a "downlink relay characteristic" and an "uplink relay characteristic", respectively. In the present embodiment, the downlink relay characteristic is not same as the uplink relay characteristic. The radio base station 100 separately determines the downlink relay characteristic and the uplink relay characteristic.

The downlink relay characteristic is as follows. For example, the radio base station 100 beforehand acquires or estimates the position of the radio terminal 300-T which is the communication partner. Then, the radio base station 100 determines the downlink relay characteristic of each relay 200 based on the position of the radio terminal 300-T at a time of start of the communication. Specifically, the radio base station 100 determines the downlink relay characteristic of each relay 200 such that the transmission paths via the relay 200 are concentrated on the radio terminal 300-T (see FIG. 2). It is thus possible to improve the communication quality with respect to the radio terminal 300-T.

When it is not possible to acquire or estimate the position of the radio terminal 300-T, the downlink relay characteristic may be determined based on other types of information. For example, information regarding a radio environment acquired through the radio communication with the radio terminal 300-T is accumulated in a database. Examples of the information regarding the radio environment include reception power, an error rate, reception quality, throughput, the number of times of re-transmission, a terminal type, and the like. The radio base station 100 may determine an appropriate downlink relay characteristic based on an evaluation result obtained by analyzing such the information.

The uplink relay characteristic is set separately from the downlink relay characteristic. As described above, the relay characteristic includes the parameter (e.g., the reflection direction, the reradiation direction, the beam width, the beam shape, and the like) that determines the coverage area CVRG in which the transmission path is formed. It is possible to change the coverage area CVRG by changing the relay characteristic. For example, the radio base station 100 determines the uplink relay characteristic such that the coverage area CVRG in the case of the uplink relay characteristic is wider than the coverage area CVRG in the case of the downlink relay characteristic (see FIGS. 2 and 3). As a result, it is more likely to establish the transmission path via the relay 200 also for the radio terminal 300-X that performs an uplink random access.

In the examples shown in FIGS. 2 and 3, the coverage area CVRG in the case of the uplink relay characteristic includes at least the coverage area CVRG in the case of the downlink relay characteristic. In this case, it is more likely to maintain the transmission path via the relay 200 in the uplink communication even for the radio terminal 300-T that has performed the downlink communication. In addition, since the coverage area CVRG in the case of the uplink relay characteristic is expanded, it is more likely to maintain the transmission path via the relay 200 even in a situation where the radio terminal 300-T moves.

Step S30: Notification Processing

In Step S30, the radio base station 100 performs notification processing. Specifically, the radio base station 100 transmits the slot configuration information SLT to the radio terminal 300-T. The radio terminal 300-T receives the slot configuration information SLT and recognizes the downlink period PDL and the uplink period PUL allocated to the radio terminal 300-T. The slot configuration information SLT is added to a downlink reference signal. For example, the slot configuration information SLT is transmitted and received as downlink control information (DCI) in a cellular system by a physical downlink control channel (PDCCH).

In addition, the radio base station 100 transmits the characteristic control information CON and the slot configuration information SLT to each relay 200. The characteristic control information CON indicates the downlink relay characteristic and the uplink relay characteristic of each relay 200. Each relay 200 receives the characteristic control information CON and the slot configuration information SLT. Any communication scheme between the radio base station 100 and the relay 200 is adopted. For example, the communication scheme may be the same as the radio communication scheme between the radio base station 100 and the radio terminal 300. As another example, the communication scheme may be wired communication such as optical communication.

Step S40: First Relay Characteristic Setting Processing

In Step S40, the relay 200 performs first relay characteristic setting processing based on the slot configuration information SLT and the characteristic control information CON. A first link period is a link period in the slot configuration indicated by the slot configuration information SLT and is one of the downlink period PDL and the uplink period PUL. A first relay characteristic is the relay characteristic during the first link period and is one of the downlink relay characteristic and the uplink relay characteristic. Before the start of the first link period, the relay 200 sets its relay characteristic to the first relay characteristic.

In the example shown in FIGS. 4 and 6, the first link period is the downlink period PDL, and the first relay characteristic is the downlink relay characteristic. The relay 200 sets its relay characteristic to the downlink relay characteristic.

Step S50: First Link Communication Processing

In Step S50, the radio base station 100 and the radio terminal 300-T perform first link communication processing based on the slot configuration information SLT. The first link communication is the communication during the first link period indicated by the slot configuration information SLT.

In the example shown in FIG. 6, the first link period is the downlink period PDL, and the first link communication is the downlink communication. The radio base station 100 and the radio terminal 300-T perform the downlink communication. Specifically, the radio base station 100 transmits a downlink data signal DAT_DL. Each relay 200 reflects the downlink data signal DAT_DL transmitted from the radio base station 100, or receives and reradiates the downlink data signal DAT_DL. The radio terminal 300-T receives the downlink data signal DAT_DL reflected or reradiated by the relay 200.

Step S60: Second Relay Characteristic Setting Processing

After Step S50 (the first link period) is ended, Step S60 is performed. In Step S60, the relay 200 performs second relay characteristic setting processing based on the slot configuration information SLT and the characteristic control information CON. A second link period is a link period next to the first link period in the slot configuration and is the other of the downlink period PDL and the uplink period PUL. A second relay characteristic is the relay characteristic during the second link period and is the other of the downlink relay characteristic and the uplink relay characteristic. Before the start of the second link period, the relay 200 sets its relay characteristic to the second relay characteristic. That is, the relay 200 switches the relay characteristic from the first relay characteristic to the second relay characteristic along with the switching from the first link period to the second link period.

In the example shown in FIGS. 4 and 6, the second link period is the uplink period PUL, and the second relay characteristic is the uplink relay characteristic. The relay 200 sets its relay characteristic to the uplink relay characteristic. That is, the relay 200 switches the relay characteristic from the downlink relay characteristic to the uplink relay characteristic along with the switching from the downlink period PDL to the uplink period PUL.

Step S70: Second Link Communication Processing

In Step S70, the radio base station 100 and the radio terminal 300-T perform second link communication processing based on the slot configuration information SLT. The second link communication is the communication during the second link period indicated by the slot configuration information SLT.

In the example shown in FIG. 6, the second link period is the uplink period PUL, and the second link communication is the uplink communication. The radio base station 100 and the radio terminal 300-T perform the uplink communication. Specifically, the radio terminal 300-T transmits an uplink data signal DAT_UL. Each relay 200 reflects the uplink data signal DAT_UL transmitted from the radio terminal 300-T, or receives and reradiates the uplink data signal DAT_UL. The radio base station 100 receives the uplink data signal DAT_UL reflected or reradiated by the relay 200.

2-4. Effects

As described above, according to the present embodiment, the radio base station 100 and the radio terminal 300-T perform bidirectional radio communication based on the TDD scheme. The slot configuration includes the allocation of the downlink period PDL and the uplink period PUL to the radio terminal 300-T. The downlink relay characteristic during the downlink period PDL and the uplink relay characteristic during the uplink period PUL are not common but determined separately. The relay characteristic during the downlink period PDL is set to the downlink relay characteristic, and the relay characteristic during the uplink period PUL is set to the uplink relay characteristic. In other words, the relay characteristic is switched between the downlink communication and the uplink communication. Flexibly switching the relay characteristic makes it possible to form appropriate transmission paths for the downlink communication and the uplink communication, respectively. As a result, the communication performance (the communication quality, the spatial multiplicity, and the like) using the relay 200 is further improved.

For example, the coverage area CVRG in which the transmission path is formed is considered (see FIGS. 2 and 3). The relay characteristic includes the parameter that determines the coverage area CVRG. It is possible to change the coverage area CVRG by changing the relay characteristic. For example, as shown in FIGS. 2 and 3, it is possible to widen the coverage area CVRG at the time of the uplink communication as compared to the coverage area CVRG at the time of the downlink communication. Thus, it is more likely to establish the transmission path via the relay 200 also for the radio terminal 300-X that performs the uplink random access. That is, the communication performance using the relay 200 is more likely to be exhibited.

In the example shown in FIGS. 2 and 3, the coverage area CVRG at the time of the uplink communication includes at least the coverage area CVRG at the time of the downlink communication. In this case, it is more likely to maintain the transmission path via the relay 200 even in the uplink communication for the radio terminal 300-T that has performed the downlink communication. Since the coverage area CVRG in the uplink communication is expanded, it is more likely to maintain the transmission path via the relay 200 even in a situation where the radio terminal 300-T moves. That is, the communication performance using the relay 200 is more likely to be exhibited.

3. Example of Configuration of Radio Communication System

An example of a configuration of the radio communication system 10 according to the present embodiment will be described below.

3-1. Radio Base Station 100

Figure 7:
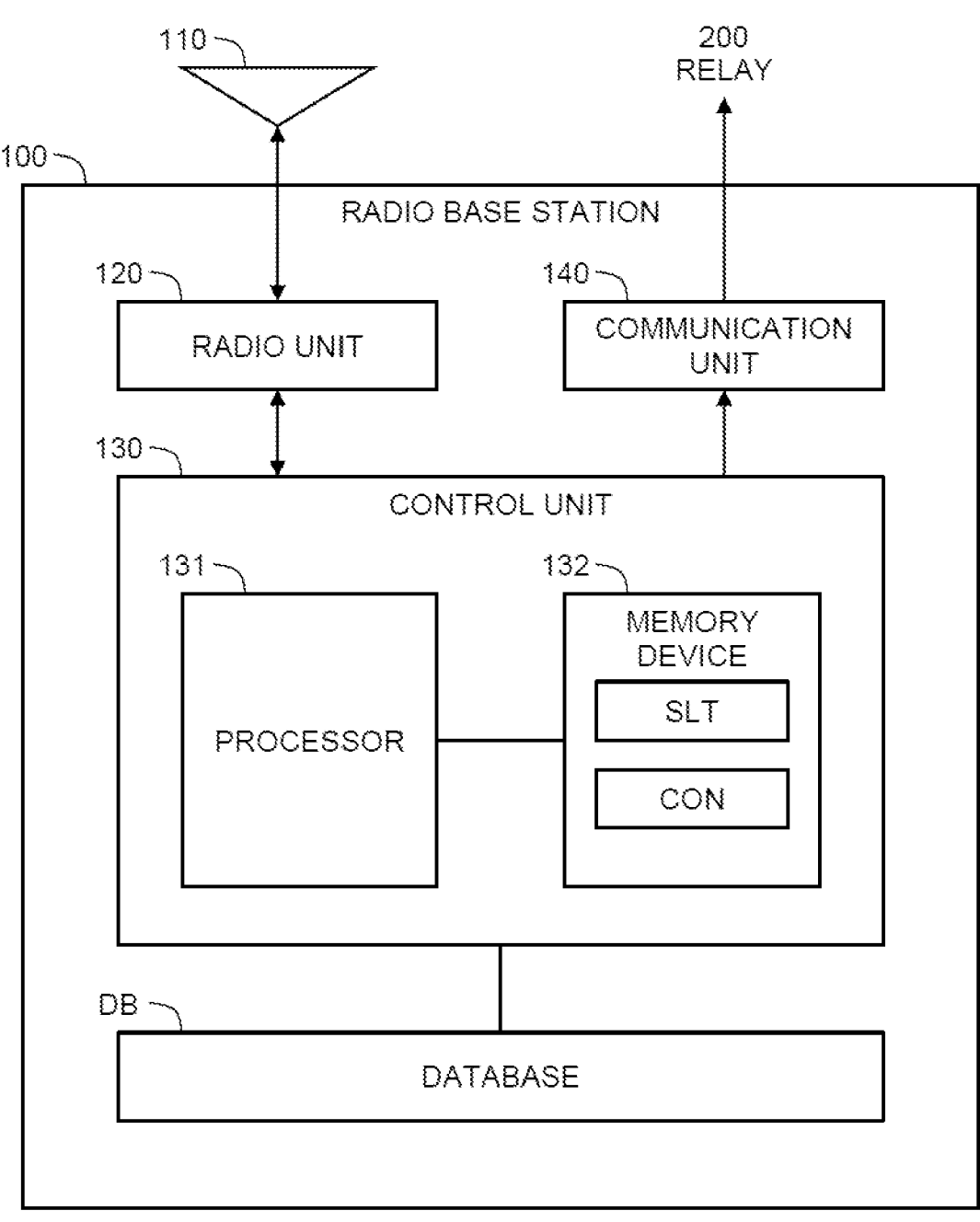
FIG. 7 is a block diagram showing an example of a configuration of a radio base station according to an embodiment of the present disclosure.

FIG. 7 is a block diagram showing an example of a configuration of the radio base station 100 according to the present embodiment. The radio base station 100 includes an antenna unit 110, a radio unit 120, a control unit 130, and a communication unit 140.

The antenna unit 110 transmits and receives radio waves. The antenna unit 110 outputs a reception signal to the radio unit 120 and transmits a signal input from the radio unit 120. Any type of antenna can be used. For example, the antenna unit 110 may include a plurality of antenna elements and a variable phase shifter to perform analog beamforming.

The radio unit 120 includes a transmitter and a receiver and performs transmission/reception processing based on the communication scheme between the radio base station 100 and the radio terminal 300-T. For example, the radio unit 120 transmits the slot configuration information SLT and the downlink data signal DAT_DL input from the control unit 130. The radio unit 120 receives the uplink data signal DAT_UL transmitted from the radio terminal 300-T, and outputs the uplink data signal DAT_UL to the control unit 130. In addition, the radio unit 120 also communicates with a higher network of the radio base station 100.

The control unit 130 performs various types of information processing. For example, the control unit 130 manages the radio terminal 300-T. For example, the control unit 130 estimates the position of the radio terminal 300-T and stores the position information of the radio terminal 300-T.

In the scheduling processing (Step S10), the control unit 130 determines the slot configuration for the radio terminal 300-T and generates the slot configuration information SLT.

In the relay characteristic determination processing (Step S20), the control unit 130 determines the downlink relay characteristic and the uplink relay characteristic of each relay 200 and generates the characteristic control information CON. For example, the control unit 130 determines the downlink relay characteristic based on the position of the radio terminal 300-T. As another example, the relay characteristic may be determined based on the information accumulated in a database DB. For example, information regarding the radio environment is acquired through the radio communication with the radio terminal 300-T and accumulated in the database DB. Examples of the information regarding the radio environment include reception power, an error rate, reception quality, throughput, the number of times of re-transmission, a terminal type, and the like. The control unit 130 may determine the downlink relay characteristic based on an evaluation result obtained by analyzing such the information. It should be noted that the database DB may be stored in a storage of the radio base station 100 or may be stored in an external storage of the radio base station 100.

In the notification processing (Step S30), the control unit 130 outputs the slot configuration information SLT to the radio unit 120. In addition, the control unit 130 outputs the slot configuration information SLT and the characteristic control information CON to the communication unit 140.

In the link communication processing (Steps S50 and S70), the control unit 130 outputs the downlink data signal DAT_DL to the radio unit 120 and receives the uplink data signal DAT_UL from the radio unit 120.

The function of the control unit 130 is implemented by a controller that performs various types of information processing. The controller includes a processor 131 and a memory device 132. The memory device 132 stores various types of information and a control program. Examples of the memory device 132 include a volatile memory and a non-volatile memory. The function of the control unit 130 is implemented by the processor 131 executing the control program stored in the memory device 132. The control program may be recorded on a non-transitory computer-readable recording medium. The controller may be implemented by using a hardware such as an application specific integrated circuit (ASIC), a programmable logic device (PLD), or a field programmable gate array (FPGA).

The communication unit 140 transmits the characteristic control information CON input from the control unit 130 to the relay 200. Any communication scheme can be used. For example, the communication scheme is wired communication such as optical communication. As another example, the communication scheme may be the same as the radio communication scheme between the radio base station 100 and the radio terminal 300 (the frequency bands may be the same or different from each other). In this case, the communication unit 140 and the radio unit 120 may be common.

3-2. Relay 200

Figure 8:
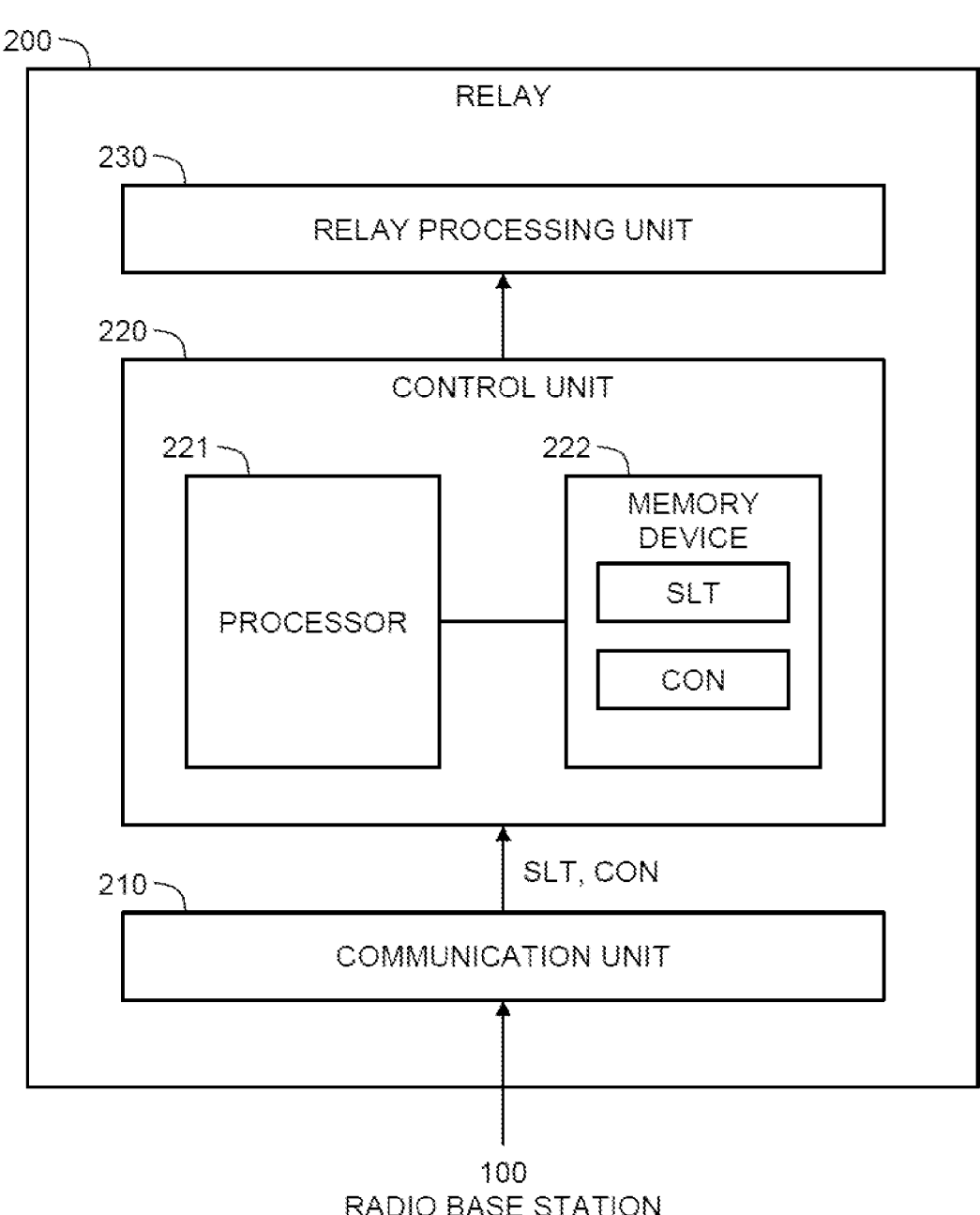
FIG. 8 is a block diagram showing an example of a configuration of a relay according to an embodiment of the present disclosure.

FIG. 8 is a block diagram showing an example of a configuration of the relay 200 according to the present embodiment. The relay 200 includes a communication unit 210, a control unit 220, and a relay processing unit 230.

The communication unit 210 receives the slot configuration information SLT and the characteristic control information CON transmitted from the radio base station 100. The communication scheme is the same as the communication scheme of the communication unit 140 in the radio base station 100. The communication unit 210 transmits the received slot configuration information SLT and characteristic control information CON to the control unit 220.

The control unit 220 stores the slot configuration information SLT and the characteristic control information CON. The control unit 220 recognizes, based on the slot configuration information SLT, the downlink period PDL, the uplink period PUL, and a timing of switching between the downlink period PDL and the uplink period PUL. Moreover, the control unit 220 recognizes the downlink relay characteristic during the downlink period PDL and the uplink relay characteristics during the uplink period PUL, based on the characteristic control information CON.

In the relay characteristic setting processing (Steps S40 and S60), the control unit 220 sets the relay characteristic according to the link period. Specifically, the control unit 220 calculates a control amount for controlling the relay processing unit 230, and outputs the control amount to the relay processing unit 230.

The relay processing unit 230 reflects a signal incident to the relay 200, or receives and reradiates the incident signal. The relay characteristic (reflection direction, reradiation direction, beam width, beam shape, and the like) is variably set in accordance with the control amount input from the control unit 220.

FIG. 9 is a block diagram showing an example of the relay processing unit 230. In the example shown in FIG. 9, the relay processing unit 230 is a reflector 240 such as a metasurface reflector. The reflector 240 includes a reflection unit 241 and a phase conversion unit 242. The reflection unit 241 includes a plurality of reflection elements. A signal incident to the reflection unit 241 is reflected via the phase conversion unit 242. The phase conversion unit 242 includes a variable phase shifter for each reflection element and converts the phase of the reflection signal such that a desired reflection direction is realized. It is also possible to realize multiple reflection directions by grouping the plurality of reflection elements.

The control unit 220 determines the reflection elements to be used, the grouping of the reflection elements, the assignment of the reflection direction to each group, and the like so that the desired relay characteristic is realized. For example, the reflection element to be used is determined based on a desired beam width or beam shape. In addition, the control unit 220 calculates a phase amount in the variable phase shifter for each reflection element so as to realize the desired reflection direction. In the calculation of the phase amount, the arrangement of the reflection elements in each group is also considered. The control unit 220 notifies the phase conversion unit 242 of the calculated phase amount as a control amount. The phase conversion unit 242 converts the phase of the reflection signal in accordance with the notified phase amount.

FIG. 10 is a block diagram showing another example of the relay processing unit 230. In the example shown in FIG. 10, the relay processing unit 230 is a repeater 250 capable of dynamically controlling the phase and amplitude of the reception signal. The repeater 250 includes an antenna unit 251 and an amplitude and phase processing unit 252. The antenna unit 251 transmits and receives radio waves. The antenna unit 251 includes a plurality of antenna elements. The antenna unit 251 inputs the reception signal to the amplitude and phase processing unit 252. The amplitude and phase processing unit 252 converts the phase and amplitude of a reradiation signal such that a desired reradiation direction is realized. The antenna unit 251 receives the reradiation signal from the amplitude and phase processing unit 252 and reradiates the signal. It is also possible to realize a plurality of reflection directions by grouping the plurality of antenna elements. A plurality of sets of the antenna units 251 may be provided.

The control unit 220 determines antenna elements to be used, grouping of the antenna elements, the assignment of the reradiation direction to each group, and the like so that the desired relay characteristic is realized. In addition, the control unit 220 calculates a phase amount and an amplitude value so as to realize the desired reradiation direction. The control unit 220 notifies the amplitude and phase processing unit 252 of the calculated phase amount and amplitude value as control amounts. The amplitude and phase processing unit 252 converts the phase and the amplitude of the reradiation signal based on the notified phase amount and amplitude value.

The function of the control unit 220 is implemented by a controller that performs various types of information processing. The controller includes a processor 221 and a memory device 222. The memory device 222 stores various types of information and a control program. Examples of the memory device 222 include a volatile memory and a non-volatile memory. The function of the control unit 220 is implemented by the processor 221 executing the control program stored in the memory device 222. The control program may be recorded on a non-transitory computer-readable recording medium. The controller may be implemented by using hardware such as an ASIC, a PLD, or an FPGA.

REFERENCE SIGNS LIST

10 Radio communication system
100 Radio base station
200 Relay
300 Radio terminal
CON Characteristic control information
CVRG Coverage area
DAT_DL Downlink data signal
DAT_UL Uplink data signal
SLT Slot configuration information

The invention claimed is:

1. A radio communication method of performing communication between a radio base station and a radio terminal via a relay, wherein the relay is configured to reflect a signal transmitted from the radio base station or the radio terminal or to receive and reradiate the signal, to form a transmission path between the radio base station and the radio terminal, a relay characteristic, which is a characteristic of the relay, includes a parameter determining a coverage area in which the transmission path between the radio base station and the radio terminal via the relay is formed, the radio communication method is based on a time division duplex (TDD) scheme and comprises:

determining a slot configuration including allocation of a downlink period and an uplink period to the radio terminal;

separately determining a downlink relay characteristic being the relay characteristic during the downlink period and an uplink relay characteristic being the relay characteristic during the uplink period;

performing downlink communication and uplink communication between the radio base station and the radio terminal during the downlink period and the uplink period, respectively; and setting the relay characteristic during the downlink period to the downlink relay characteristic and setting the relay characteristic during the uplink period to the uplink relay characteristic.

2. The radio communication method according to claim 1, wherein the coverage area in a case of the uplink relay characteristic is wider than the coverage area in a case of the downlink relay characteristic.

3. The radio communication method according to claim 2, wherein the coverage area in the case of the uplink relay characteristic includes at least the coverage area in the case of the downlink relay characteristic.

4. The radio communication method according to claim 1, wherein the parameter determining the coverage area includes at least a reflection direction or a reradiation direction of the signal in the relay.

5. The radio communication method according to claim 1, wherein the determining the slot configuration and the determining the downlink relay characteristic and the uplink relay characteristic are performed by the radio base station, the radio communication method further comprises:

transmitting slot configuration information indicating the slot configuration from the radio base station to the radio terminal; and transmitting characteristic control information indicating the downlink relay characteristic and the uplink relay characteristic and the slot configuration information from the radio base station to the relay, and the setting the relay characteristic is performed by the relay based on the slot configuration information and the characteristic control information.

6. A radio communication system comprising:

a radio base station configured to communicate with a radio terminal based on a time division duplex (TDD) scheme; and a relay configured to reflect a signal transmitted from the radio base station or the radio terminal or receive and reradiate the signal to form a transmission path between the radio base station and the radio terminal, wherein a relay characteristic, which is a characteristic of the relay, includes a parameter determining a coverage area in which the transmission path between the radio base station and the radio terminal via the relay is formed, the radio base station is configured to:

determine a slot configuration including allocation of a downlink period and an uplink period to the radio terminal;

separately determine a downlink relay characteristic being the relay characteristic during the downlink period and an uplink relay characteristic being the relay characteristic during the uplink period;

transmit slot configuration information indicating the slot configuration to the radio terminal; and transmit characteristic control information indicating the downlink relay characteristic and the uplink relay characteristic and the slot configuration information to the relay, the radio base station and the radio terminal perform downlink communication and uplink communication during the downlink period and the uplink period, respectively, based on the slot configuration information, and the relay is configured to set the relay characteristic during the downlink period to the downlink relay characteristic and set the relay characteristic during the uplink period to the uplink relay characteristic, based on the slot configuration information and the characteristic control information.

7. A radio base station that communicates with a radio terminal based on a time division duplex (TDD) scheme, wherein a relay is configured to reflect a signal transmitted from the radio base station or the radio terminal or receive and reradiate the signal to form a transmission path between the radio base station and the radio terminal, a relay characteristic, which is a characteristic of the relay, includes a parameter determining a coverage area in which the transmission path between the radio base station and the radio terminal via the relay is formed, the radio base station is configured to:

determine a slot configuration including allocation of a downlink period and an uplink period to the radio terminal;

separately determine a downlink relay characteristic being the relay characteristic during the downlink period and an uplink relay characteristic being the relay characteristic during the uplink period;

transmit slot configuration information indicating the slot configuration to the radio terminal; and transmit characteristic control information indicating the downlink relay characteristic and the uplink relay characteristic and the slot configuration information to the relay, the radio base station and the radio terminal perform downlink communication and uplink communication during the downlink period and the uplink period, respectively, based on the slot configuration information, and the relay is configured to set the relay characteristic during the downlink period to the downlink relay characteristic and set the relay characteristic during the uplink period to the uplink relay characteristic, based on the slot configuration information and the characteristic control information.

* * * * *